June 17, 1958

C. E. RICKARD ET AL 2,839,089

PACKED SAFETY LOCK PIPE COUPLING
WITH REMOVABLE GRIP ANNULUS

Filed March 9, 1954

INVENTORS.
Clyde E. Rickard
Gustav A. Hempel
BY Green, McCallister & Miller

THEIR ATTORNEYS

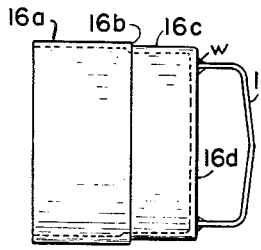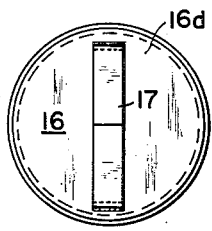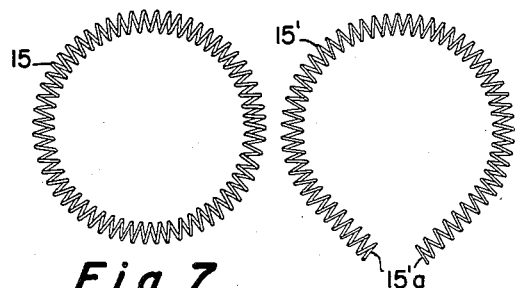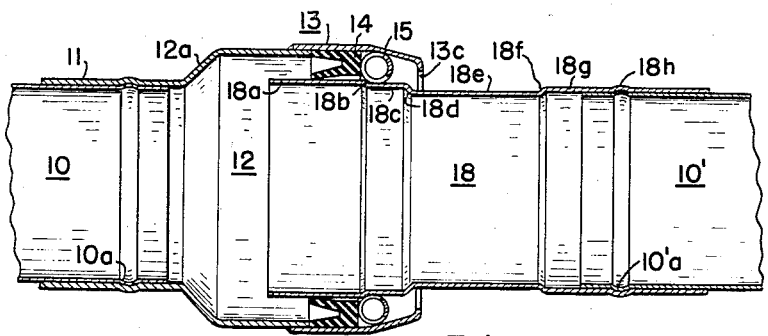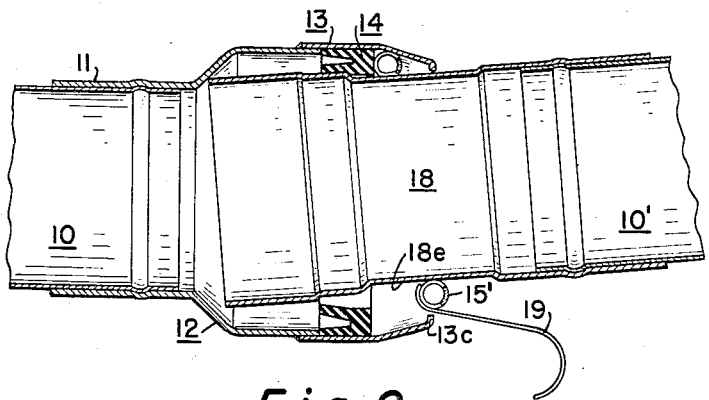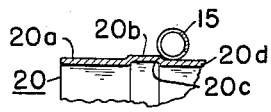

United States Patent Office 2,839,089
Patented June 17, 1958

2,839,089

PACKED SAFETY LOCK PIPE COUPLING WITH REMOVABLE GRIP ANNULUS

Clyde E. Rickard and Gustav A. Hempel, Pittsburgh, Pa., assignors to McDowell Manufacturing Company, Pittsburgh, Pa., a corporation of Pennsylvania Application March 9, 1954, Serial No. 415,056

3 Claims. (Cl. 138—89)

This invention relates to a safety lock type of fluid coupling and particularly, to a positively connected type of quick release coupling.

In recent years, quick release couplings of the type employing a grip annulus and an annular operating gasket have gained wide acceptance, particularly where pipe or tubing sections are to be temporarily or semi-permanently connected together as, for example, in connection with portable irrigation systems. A coupling of this type becomes effectively operative to produce a proportional member holding action by the application of fluid or liquid pressure.

To provide a relatively straight, axial, pull-out release of a pair of connected pipe members or sections, the grip annulus may have an inner diameter that is slightly greater than that of the pipe or tubing end portion to be held in position and as a result, the installation may have little initial or mechanical holding action until positive fluid pressure is applied. Where the coupling is located in a string or length of pipe or tubing members or sections, the slight resistance of the pipe members to separation by reason of their weight and their friction with the ground, for example, may be sufficient to prevent them from being separated until an application of fluid pressure has become effective to positively hold them in position.

When, however, the pipe line is to bridge a dip in the contour of the ground or is to extend across an open space between ridges or where a dead end portion is to be used, difficulty has been encountered from the standpoint that the dead end or the pipe section involved may separate before fluid pressure is applied. The separation may occur by reason of an active axial tension or pulling-apart action between the pipe sections that are coupled together and by reason of the fact that the initial mechanical holding action is not sufficient to initially hold the members in a coupled or inter-connected relationship until fluid pressure has become effective. Also, a dead end portion or pipe section, even when mechanical resistance is sufficient to hold it in position when fluid pressure is off, may shoot out of its coupled relationship or tend to lose its proper coupled position, as a result of an initial application of fluid pressure or as a result of a creeping action due to periodic line surges or to periodic applications of fluid pressure.

The present invention has been devised to meet a definite need in this connection for what may be termed a safety-lock type of coupling or one in which the connected relationship of the pipe or tubing members or sections is positively maintained and irrespective of the application of fluid pressure.

In this connection, we have found that the desideratum is to provide an arrangement that will insure a full, fluid pressure-sensitive gripping action, a relatively loose-pivoted-coupled relationship when fluid pressure is released, and a quick release in coupling action when it is desired, but which will be dependent upon some simple mechanical operation as a safety feature before an actual separation of the coupled members can be accomplished.

We have been able to devise and develop a coupling of this construction which meets a definite need as to particular phases of utilization of couplings in a portable system, such as for irrigating purposes. In this connection, it should be noted that the present-day tendency is toward lighter weight tubing sections and as a result, aluminum and light metal alloys as well as plastics have been found to be suitable. Such materials, in themselves, present less resistance to a mechanical pulling-out action upon a coupled member before fluid pressure has been effective in accomplishing a positive holding action.

It has thus been an object of our invention to provide a solution to the problem presented and to do so in a practical and effective manner.

Another object has been to develop and devise a new and improved form of coupling and essentially, a quick release coupling that will positively retain its members in a connected relationship until something positive has been done by the operator and independently of any external, axial, separating force applied to the connected members.

A further object of our invention has been to devise a coupling in which the coupled members cannot be fully separated or disconnected until a grip annulus or coil employed has been removed from an operating relationship with respect to the members or from a position within a housing body of the coupling.

These and many other objects of our invention will appear to those skilled in the art from the following description thereof.

In the drawings:

Figure 1 shows the first step in an assembling operation and as applied to the positioning of an annular sealing gasket within a housing member or body of the coupling;

Figure 2 illustrates a second step in the assembling operation and as applied to both the coupling housing body and a nose member or body;

Figure 3 illustrates a third step in the assembling operation, showing all the parts employed in the coupling (including a grip annulus) in an initial assembled relationship;

Figure 4 illustrates the final position of the coupling parts, such as may be effected by axially or longitudinally manually moving the nose member outwardly or by the application of fluid pressure;

Figure 4:
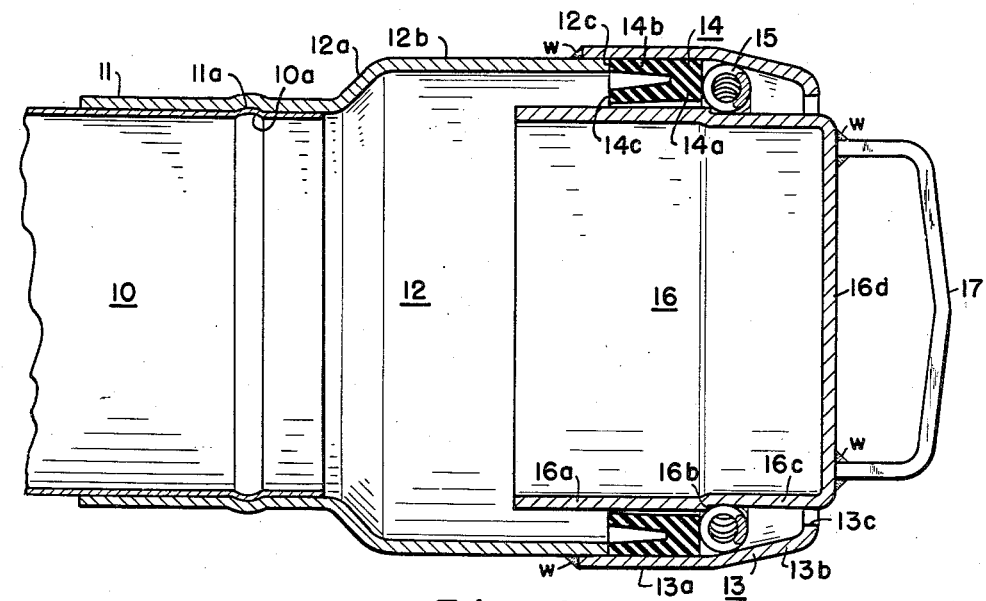
Figure 4 is a full side section in elevation illustrating the construction of our coupling invention as employed with a nose member having a closing end wall (dead end housing member); these figures bring out the steps involved in assembling and disassembling the coupling.

These figures also illustrate the method of disassembling the coupling, the steps being accomplished in their reverse order;

Figure 5 is a reduced side vertical view in elevation of the nose member or body of Figure 4;

Figure 6 is a back end view in elevation on the same scale as Figure 5 of the same nose member or body;

Figure 7 is an end view in elevation on the scale of Figures 5 and 6, illustrating a closed or connected end type of grip coil or annulus which may be utilized and Figure 7A is a similar view illustrating an open-end type of grip coil or annulus;

Figure 8 is a side sectional view in elevation on the reduced scale of Figure 5, illustrating the application of our coupling invention to a pair of fluid-carrying pipe or body members; in this figure, clearance spacing provided makes possible the utilization of a grip coil or annulus of the type of Figure 7;

Figure 9 is a side sectional view in elevation of a construction similar to Figure 8, except that the clearance spacing has been reduced by one-half, as has been made possible by the grip annulus or coil of Figure 7A; this figure also illustrates the use of a tool to facilitate the removal of the grip annulus;

And, Figure 10 is a fragmental side section on the scale of Figures 8 and 9 showing a modified form of nose construction.

As to both Figures 8 and 9, it will be noted that the immediately coupled or connected parts have an internal diameter that is at least equal to the internal diameter of the pipe or tubing members or sections that are being employed. Thus, throttling of the fluid or liquid being carried is prevented from the standpoint of such coupling parts. It will be further noted in Figure 9 that the lesser clearance spacing required makes possible a minimized necking of a central or neck portion of the nose body part and a minimized enlargement of the coupling housing body part to provide an effective fluid flow diameter without throttling action.

In carrying out our invention, we utilize the parts of a quick release type of coupling, but do it in such a manner that such parts and essentially the grip annulus or element, is always positively retained in a withdrawal-preventing or member separation-preventing relationship, until certain manual operations have been accomplished.

Briefly stated, our invention utilizes the idea of requiring the removal of the grip annulus, element or coil 15 before coupled tubing or pipe members 10 and 10' can be separated, and irrespective of whether the separating force is one encountered in connection with a periodic application of fluid pressure or by reason of external, axial, separating force applied to the coupled members. This holding action of the grip annulus 15 is independent of its positive grip action as effected by fluid pressure applied to a sealing gasket 14.

To provide our safety construction, we have devised an arrangement wherein the coupled parts are contoured or constructed in such a manner that any outward separating force applied to them will only tend to increase the holding action of the grip annulus or element 15, and independently of an application of fluid pressure. The construction is also devised in such a manner that a relative pushing-in action between the coupled members will enable the operator to remove the grip element 15 and as soon as it has been removed, to then easily and quickly axially or longitudinally separate the members with respect to each other.

Referring particularly to Figures 1 to 4 inclusively, we have illustrated an end portion of a pipe or tubing section or member 10 which is secured by an outwardly-offset bead portion 10a within a sleeve-like end portion 11 of a coupling housing body 12. The bead 10a fits within a complementary concave side or groove of bead 11a that is formed in the sleeve end portion 11. The sleeve end portion 11 is integrally connected with the housing body 12 by an outwardly-offset, internal limit shoulder portion 12a. The body 12 has an annular or cylindrical portion 12b whose inner edge 12c forms a stop abutment or inner positioning limit for a lip edge of a radial-outer side wall portion 14b of a resilient, fluid-sensitive, annular sealing gasket 14.

A forward operating surface part 13 fits over and is secured as by weld metal w to the cylindrical portion 12b and has a cylindrical or annular portion 13a to receive, position and seat the outer side wall 14b of the gasket along its extent. The part 13 has a radially-inwardly and longitudinally-outwardly converging, cone-shaped throat portion 13b connected to the portion 13a and terminating in a radially-inwardly projecting flange or rim edge portion 13c. The cone-shaped throat portion 13b serves as an operating surface for operatively carrying and positioning an outer flexible grip annulus or coil element 15 or 15' of the constructions shown in Figures 7 and 7A.

Figure 2:
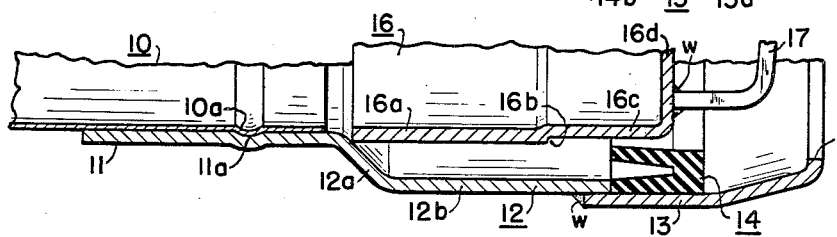
Figure 3:
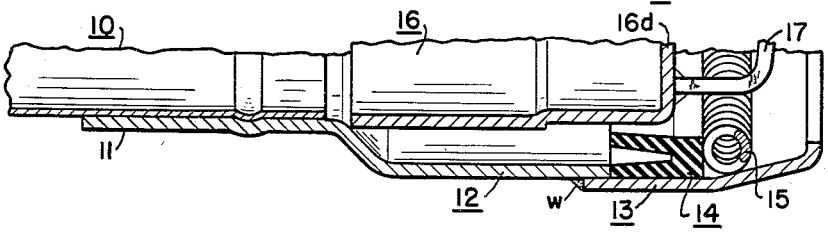

A male nose member part or body 16 of a dead end or closed end wall type has an annular or cylindrical inner end portion 16a of larger diameter that constitutes a sealing surface portion for a radial-inner side wall portion 14c of the gasket 14. The portion 16a is connected by radially offset positive stop shoulder portion 16b to an annular or cylindrical outer engaging surface portion 16c of smaller diameter for the grip annulus 15. As noted in Figures 2, 3, and 4, the radial depth or distance between the inner sealing surface 16a of the nose member and the cylindrical portion 12b of the female housing is less than the radial depth of the convolutions of the grip annulus 15. The nose 16 has an outer, radially-inwardly offset portion that is positioned outwardly beyond the portion 16c and that is provided by an outer end wall 16d. The offset portion defines a radial spacing with respect to an outer end portion of the housing body (see rim flange 13c) that is sufficient to permit an outward removal of the grip annulus 15 from the throat portion 13b, when, as shown in Figure 3, the nose part 16 is moved inwardly within the housing body until its outer engaging surface portion 16c is out of engagement with or clears the grip annulus 15. A loop-like or U-shaped operating handle 17 is secured to, project outwardly from the end wall 16d, as by weld metal w, and is employed to move the nose 16 inwardly and outwardly within the housing body. As shown in Figures 2 and 3, the internal limit shoulder portion 12a is engaged by an inner end of the inner sealing surface portion 16a to define the maximum inward movement of the nose 16 with respect to the housing body.

Figure 1:
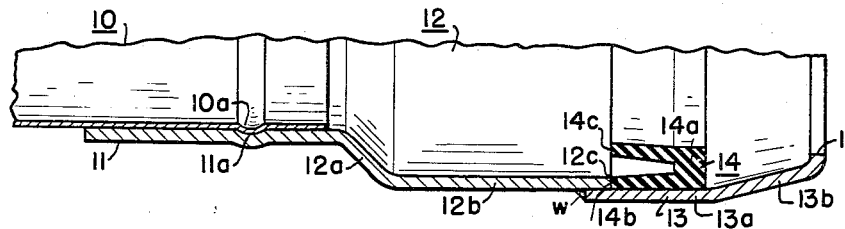
Figures 1, 2 and 3 are fragmental side sections in elevation

In utilizing the construction of Figures 1 to 4, inclusive, when, for example, a dead-end nose member 16 is to be utilized, we first insert the gasket 14 into position within the housing body (as shown in Figure 1) through the outer or open end portion of the housing body, as defined by the rim flange or edge portion 13c. In the second step, the nose 16 is then pushed axially or longitudinally into the approximate position shown in Figure 2, that, as a maximum, is a distance such that its inner edge or end abuts the connecting shoulder portion 12a.

In the third step, the grip annulus 15 is mounted or pushed inwardly to an operative position (as shown in Figure 3) on the throat 13b of the operating surface 13. As a final step, the handle 17 may be gripped to pull the nose member 16 outwardly to the position of Figure 4, or this may be done automatically by the application of fluid pressure, or if the member 16 is a pipe member, by any outward axial pull or tension thereon. In any event, when the coupling construction is in the assembled relationship of Figure 3, the nose part 16 can only be moved outwardly to a position substantially corresponding to that of Figure 4, regardless of whether or not fluid pressure is being applied.

At the position of Figure 4, the radial-inner side wall 14c of the gasket 14 which has an outward flare, is in an engaging-operative position with the inner sealing surface portion 16a of the body 16 and a heel portion 14a of the gasket is in engagement with the grip element or annulus 15. The grip element 15 has its internal periphery in engagement with the shoulder 16b adjacent the concavity or valley defined thereby, and its outer periphery is in operative engagement with the sloped or conic surface of the throat 13b. It will thus be apparent that any attempt to move the nose member 16 further axially-outwardly is positively prevented by the engagement of the coil 15 with the shoulder 16b, as well as by its engagement with and advancement towards the converging end of the throat 13b. There is thus no way in which the nose member 16 can be removed (the coupled members separated) by pulling it outwardly, unless the grip element 15 has been first manually removed as shown in Figure 2. This is true although, when no fluid pressure is being applied, the members 12 and 16 are relatively loosely positioned with respect to each other and may be pivoted or cocked with respect to each other. It can also be seen from the foregoing that, since the annulus 15 abuts both the shoulder 16b and the heel portion 14a of the gasket, together with the fact that the space between inner cylindrical portion 16b and female housing 12b is smaller than the diameter of the convolutions of the annulus 15, the nose member 16 cannot be removed from the housing by pushing the annulus inwardly over the stop shoulder 16b.

When the operator wishes to remove the nose member 16, the operation is reversed, although it will be appreciated that removal cannot be accomplished when an effective fluid pressure application is being made to the open chamber of the gasket 14. Once fluid pressure has been relieved, however, the nose member 16 can be pushed inwardly to the position of Figure 3 and the element 15 may then be flexed inwardly and moved outwardly from the open end of throat 13 of the housing body 12. After this is done, the nose member 16 can be easily pulled completely out of the housing body past the gasket 14, compare Figures 2 and 1.

In the construction shown in Figures 8 and 9, we have illustrated the application of our coupling construction, where a pair of pipe or tubing members or sections 10 and 10′ are to be connected together. It will be noted that the housing body 12 and its mounting on the end portion of pipe section 10 is the same as shown for the construction of Figure 4. The other pipe section 10′ has a beaded portion 10′a interfitting with the groove or valley of a beaded portion 18h of a mounting sleeve portion 18g of a connector nose member or body 18 and in general, is mounted in the same manner as the pipe member 10 is mounted in the sleeve portion 11 of the housing body.

The connector nose member 18 has an enlarged annular or cylindrical inner end portion 18a connected by a radially offset positive stop shoulder portion 18b to an annular or cylindrical outer engaging surface portion 18c of smaller diameter corresponding, respectively, to the portions 16a, 16b and 16c of the construction of Figure 4. To permit ready removal of the grip annulus 15, however, the outer surface portion 18c of the nose member 18 is connected by a radially offset shoulder portion 18d to annular or cylindrical intermediate neck portion 18e of still smaller diameter and which is, in turn, at its other end connected by a radially offset shoulder 18f to the mounting sleeve portion 18g.

Employing the construction of Figure 8, the operation of assembly and disassembly of the parts is the same as the construction shown in Figures 1 to 4. In this connection, when the grip annulus or element 15 is to be removed, the nose member 18 is moved inwardly towards the internal limit shoulder portion 12a to, as in the construction of Figure 3, move the engaging surface portion (18c) off or clear of the grip annulus 15, at which time, sufficient clearance is given between the outer offset portion (neck 18e) on the nose part and the outer end portion (rim flange 13c) of the housing body for the operator to insert his fingers and pull out the element 15. The element 15 may again be operatively mounted by pushing it into position. As shown in Figure 3, the inwardly-offset portion 16d and, as shown in Figure 9, the inwardly-offset portion 18e define a radial-inner relief or grip-release clearance spacing with the inner diameter of the grip element or coil 15 when, as shown in these figures, the nose portion or pipe end member 16 or 18 is pushed inwardly of the housing body 12.

In the embodiment of Figure 9, we have shown a construction wherein the clearance spacing provided for removal of the grip element 15 is about one half that required for the construction of Figure 8. Reference is made to the radial spacing between rim edge portion 13c and the intermediate or neck portion 18e. This is made possible by the utilization of a coil 15′ of Figure 7A, whose ends 15′a are not connected as are the ends of the coil 15 of Figure 7. It is thus possible for the operator to insert his finger or a hook-tool 19 over the coil 15′ adjacent one of its ends to pull such end outwardly through the spacing provided between outer offset portion of the nose member and the outer end portion of the housing body. In this connection, it will be noted that the assembly is tilted or cocked so as to provide all of the spacing along one side of the assembly, instead of a substantially equal spacing along the full annular area, as employed in removing the coil 15 from the construction of Figures 3 and 4. In Figures 3 and 4, an annular spacing is employed that is, as a minimum, about equal in radial depth to a radial depth of or a transverse central section through strut portions or convolutions of the grip element 15. The construction of Figure 9 thus permits a maximum internal area for fluid flow with a minimum radial-outward offset of the housing body with respect to the internal diameter of the pipe members 10 and 10′.

When the coupling construction of our invention is in assembled position, as represented for example by Figures 4 and 8, it will be apparent that it is also proportionally sensitive to a positive fluid pressure application through the chambered gasket 14 and its pressure heel or base portion 14a. The latter applies a proportionate forward force on the grip element or annulus 15 to move it into progressively tighter engagement between the opposing converging throat portion 13b and the annular or cylindrical portion 16c or 18c. The rim edge or flange portion 13c provides a positive outer safety limit stop for the grip element 15.

It will be noted that the positive stop shoulder portion 16b of the construction of Figure 4 and the like shoulder 18b of the construction of Figures 8 and 9 controls or limits the maximum outward separating action that may be effected when fluid pressure is off and while the grip element 15 is in position within the housing body. The internal limit shoulder portion 12a of the housing body controls or limits the maximum relative inward movement of the coupling nose member 16 or 18, even when the grip element 15 has been removed. Thus, it is important that the diameter of the inner end portion 16a or 18a of the coupling nose member be large enough that its inner end will abut against and not by-pass the shoulder portion 12a, however, it is also important that the radial space between inner end portion 16a (or 18a) and the annular or cylindrical portion of the housing 12b be smaller than the thickness diameter or depth of the annulus 15, so that it will not slip therebetween. For the purpose of a manual removal of the grip annulus or element 15 (or 15′), it is important to provide a radial clearance spacing between a pair of adjacent portions of the converging end of the throat portion of the housing body and an outer portion of the nose member that is, as a minimum, see Figure 9, not substantially less than the radial depth of or a transverse central section through an end portion of the grip annulus 15 (or 15′) to permit the grip element to be manually squeezed, lifted or pulled out of position from within the housing body. It is also important to mount or position the grip element 15 (or 15′) behind the larger inner diameter portion 16a or 18a, or in other words, outwardly or forwardly of the separation-preventing positive stop shoulder 16b or 18b.

In Figure 10, I have shown a coupling nose member 20, whose annular or cylindrical inner and outer end or surface portions 20a and 20d are of the same diameter and are connected by a radially-outwardly projecting annular or cylindrical intermediate portion 20b of greater diameter. The portion 20b defines a band or bead that, with the portion 20d, provides a positive stop limit shoulder portion 20c for the grip element or coil 15. The shoulder 20c corresponds in function to the shoulder 16b of Figure 4 and to the shoulder 18b of Figure 8. In the construction of Figure 10, a bead 20b can be easily roll-expanded into a nose part of any desired diameter to provide the shoulder 20c. If this construction is employed in making a dead-end nose, such as 16, the outer portion 20d corresponds to the portion 16c of Figure 4 and the diameters of the portions 20a and 20d preferably correspond to the diameter of the portion 16c, rather than to the diameter of the portion 16a. When this construction is employed in providing a connector nose member, such as 18, the diameters of the portions 20a and 20d preferably correspond to diameter of the portion 18c, rather than to that of the portion 18a. Although the gasket 14 will effectively operate in this modified construction, it may, if desired, have a slightly greater depth corresponding to the slightly smaller diameter of the portion 20a.

What we claim is:

1. In a quick-release safety-lock positive-holding fluid coupling having a housing body for removably receiving a nose member therein, wherein the housing body has an internal operating surface defined by an annular portion to position a fluid-sensitive annular gasket and by a cone-shaped throat portion that converges outwardly from the annular portion to operatively carry and position a flexible grip annulus therein in a cooperating fluid-pressure-sensitive grip-applying relation with the gasket, the combination of an annular inner sealing surface portion for the gasket and an annular outer engaging surface portion of smaller diameter for the grip annulus on said nose member, said inner sealing and outer engaging portions each being of substantial axial length, said annular outer engaging surface being radially-inwardly offset and extending longitudinally-outwardly beyond said inner sealing surface, a stop shoulder connecting said inner sealing and outer engaging surface portions to limit the maximum inward position of the grip annulus on said nose member, said inner sealing surface portion having a diameter that is greater than an internal diameter of the grip annulus and said outer engaging surface portion having a diameter that is substantially the same as an internal diameter of the grip annulus when the grip annulus is operatively carried and positioned by the cone-shaped throat portion in an engaging position with said outer engaging surface portion to prevent an outward removal of said nose member from within the housing body; a cylindrical portion radially-inwardly offset from and extending longitudinally from the internal operating surface which positions the annular gasket within said housing body, an end of said radially-inwardly offset cylindrical portion and adjacent said internal operating surface, forming an inner positioning limit portion for a lip edge of said annular gasket; said cylindrical portion terminating in a radially-inwardly offset stop limit portion which cooperates with the forward edge of said inner sealing surface portion and limits maximum inward movement of said nose member within the housing body, said offset cooperating portion being spaced from the axially innermost end of said gasket a distance greater than the axial length of said inner sealing surface portion, said inner sealing surface of said nose member being longitudinally-parallel to and radially-inwardly-spaced from said cylindrical portion and said internal operating surface of said housing body, the radial depth of the space defined by the said inner sealing surface and said internal operating surface being less than the radial depth of the convolutions of the grip annulus and thereby preventing the annulus from sliding inwardly on said inner sealing surface; and a radially-inwardly offset outer portion on said nose member outwardly beyond said outer engaging surface portion, said offset portion being of such a radial depth as to define with respect to the outer end portion of the housing body a radially circumferentially extending space having a radial dimension at any point at least as great as one-half the width of the convolutions of the grip annulus, the distance from the said cooperating portion of the said stop limit portion to the axially outer end of the said gasket being greater than the axial distance from the inner end of said nose member to the radially inwardly offset portion, to permit an outward removal of the grip annulus from the cone-shaped throat portion when said nose member is moved inwardly to said stop limit portion within the housing body, whereby its outer engaging surface portion is positioned out of engagement with the grip annulus.

2. A safety lock fluid coupling as defined in claim 1 wherein, an annular neck portion extends outwardly from said engaging surface portion and is connected thereto by a shoulder portion, said annular neck portion provides said outer offset portion and at its outer end has means for securing it to a fluid-carrying member, and said neck portion has a smaller diameter than said engaging surface portion.

3. A safety lock fluid coupling as defined in claim 1 wherein, said nose member is a dead-end member having an outer end wall providing said outer offset portion, and handle means is secured on said end wall for manually moving said dead-end member inwardly and outwardly within said housing body.

References Cited in the file of this patent

UNITED STATES PATENTS

| Number | Name | Date |
|---|---|---|
| 554,666 | Feltner | Feb. 18, 1896 |
| 1,771,949 | Blanchard | July 29, 1930 |
| 2,111,956 | Baldwin | Mar. 22, 1938 |
| 2,127,086 | McGrath | Aug. 16, 1938 |
| 2,398,399 | Alexander | Apr. 16, 1946 |
| 2,479,960 | Osborn | Aug. 23, 1949 |
| 2,587,810 | Beyer | Mar. 4, 1952 |
| 2,590,565 | Osborn | Mar. 25, 1952 |
| 2,638,362 | Sherman et al. | May 12, 1953 |
| 2,653,042 | Aldrich et al. | Sept. 22, 1953 |

FOREIGN PATENTS

| Number | Country | Date |
|---|---|---|
| 621,831 | Germany | Nov. 14, 1935 |